Aug. 2, 1932.   V. G. APPLE   1,870,085
LAMINATED CORE
Filed Oct. 7, 1929
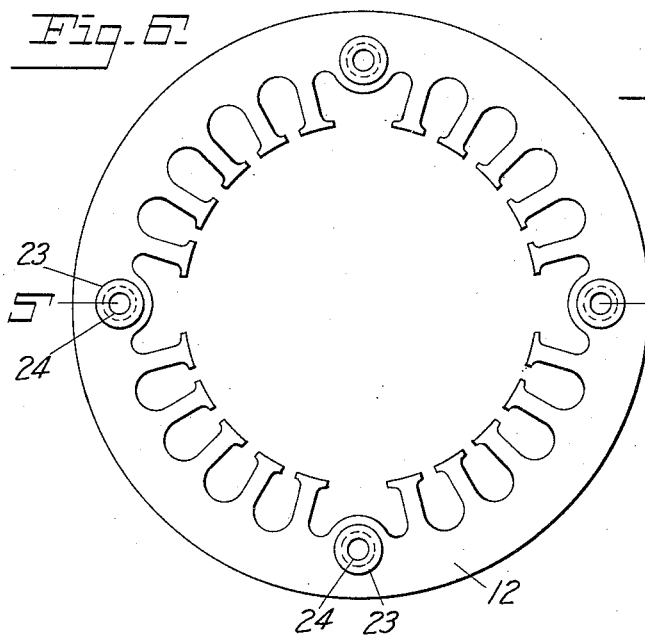
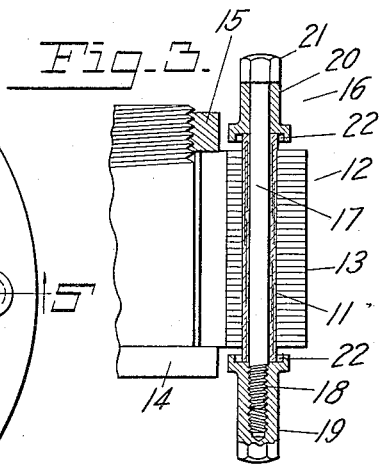
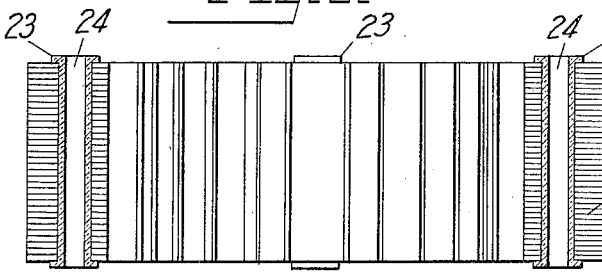
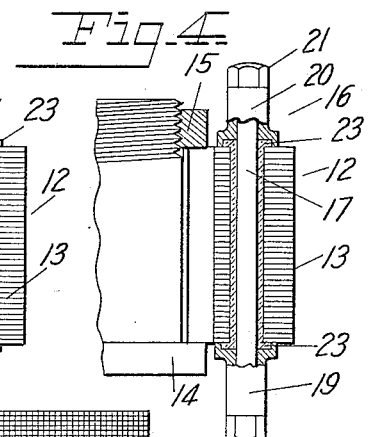
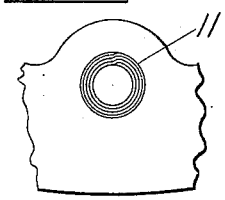
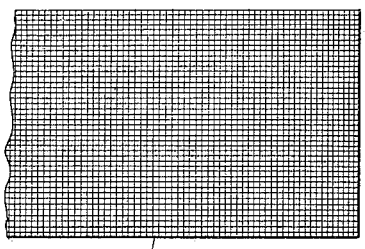
INVENTOR
Vincent G. Apple Patented Aug. 2, 1932

1,870,085

UNITED STATES PATENT OFFICE

VINCENT G. APPLE, OF DAYTON, OHIO

LAMINATED CORE

Application filed October 7, 1929. Serial No. 397,894.

This invention relates to laminated structures, and particularly to cores of electromagnetic devices, and still more particularly to such of these cores as have openings passing lengthwise therethrough which must be provided with bushings of insulation through which other members of the structure which are necessarily insulated from the core may extend.

The object of the invention is to so form and to so apply the bushings of insulation to the core openings as to adapt them to serve also as rivets for holding the laminæ of the core together.

I attain this object by formulating the procedure, providing the tools, and producing the structure described in the following specification, wherein reference is made to the accompanying drawing in which—

Fig. 1 represents a fragment of the strip of insulation saturated fabric which I employ to form a bushing.

Fig. 2 is an enlarged fragment of a core as viewed from the end showing how the strip of insulation Fig. 1 is rolled up in the form of a bushing.

Fig. 3 is a fragmentary section of a core and the mandrel for temporarily holding the laminæ together, with the insulation bushing in place together with a tool for forming heads on the bushing to convert it into a hollow rivet.

Fig. 4 shows the structure after the rivet forming tool has operated.

Fig. 5 is an axial section taken at 5—5 of Fig. 6 through a core after the rivet forming tools and the mandrel are removed.

Fig. 6 is an end view of a completed core showing end views of the completed hollow rivets of insulation which hold it together.

Similar numerals refer to similar parts throughout the several views.

The fabric tape 10 Fig. 1 preferably of rather loosely woven cotton fibre is heavily saturated with liquid insulation and partly dried. Determined lengths of this tape are cut off and rolled around suitable pins to form bushings 11, Fig. 2.

A core 12, composed of a plurality of laminæ 13, is formed by assembling the laminæ on the mandrel 14 and compacting them with the nut 15, and while the core is so compacted the bushings 11 are inserted in proper openings extending therethrough. The laminæ 13 are preferably coated, before assembling, with an insulation similar to that used to saturate the tape, but this operation is not absolutely necessary to the invention.

The tools 16 for forming hollow rivets from bushings 11 comprises a relatively long screw 17 threaded at the outer end 18 into the nut 19 and having a collar 20 adjacent its head 21. Both nut 19 and collar 20 are cupped out as at 22 to a diameter and depth corresponding to the head of the hollow rivet which is to be formed.

With the laminæ 13 on mandrel 14 compacted by nut 15, and with bushings 11 in the openings of the core, a tool 16 is placed in each bushing as shown in Fig. 3, and the heads 21 are turned until the nuts 19 and the collars 20 are drawn against the core 12 as in Fig. 4, thus forming the heads 23 on the bushings 11 making hollow rivets 24, Fig. 5, of them.

While the various parts are assembled as shown in Fig. 4 the insulation in the hollow rivets is thoroughly hardened by heat or otherwise, depending on the nature of the insulation used whereupon the tools 16 and the mandrel 15 are removed.

The axial section Fig. 5 and the end view Fig. 6 show a completed core 12 for a dynamo electric machine field held together by four hollow rivets 24, and while this dynamo electric machine core is selected for illustration it is obvious that cores of other shapes for other devices may be treated in the same manner.

As my invention, I claim:

1. The method of forming a lining of insulation in an opening extending through conductive material, which consists of inserting a bushing of fibrous material saturated with liquid insulation into the said opening to extend considerably beyond it at the end, drawing down the extending end to form a head, and hardening the insulation.

2. The method of forming a lining of insulation in an opening extending through conductive material, which consists of inserting bushings of woven fabric saturated with liquid insulation into said openings to extend considerably beyond at the ends, drawing down the extending ends to form heads, then hardening the insulation.

3. The method of forming a lining of insulation in an opening extending through conductive material, which consists of rolling up a piece of insulation saturated woven fabric to compose a bushing, inserting it in the said opening so that it extends considerably beyond it at each end, drawing down the extending ends to form heads, then hardening the insulation.

4. The method of making a laminated core with insulation lined openings therethrough, which consists of stacking the laminæ, temporarily holding them together, inserting bushings of insulation saturated fibrous material in said openings to extend considerably beyond at each end of said core, drawing down the extending ends to form heads, hardening the insulation, then removing the temporary holding means.

5. The method of holding together the laminæ of a core by tubular rivets of insulation, which consists of stacking the laminæ, temporarily holding them together, inserting bushings of insulation saturated fabric through openings in said core to extend considerably beyond the core at each end, placing cupped members over the extending ends, passing bolts through said members and said bushings, drawing the said members together with said bolts to press the extending ends into said cups to form heads, hardening the insulation, then removing the bolts and the cupped members.

6. The method of making a laminated core which consists of, coating the laminæ with liquid insulation, partly drying them, assembling them into a core, placing bushings of insulation saturated fabric into openings extending lengthwise through the core, said bushings extending beyond the core at both ends, forming the extending ends of the bushing into heads, then hardening the insulation in the bushings and between adjacent laminæ.

7. The method of making a laminated core which consists of, coating the laminæ with liquid insulation, partly drying them, assembling them into a core, compacting them with a temporary holding means, placing bushings of insulation saturated fabric into openings extending lengthwise through the core and considerably beyond the core at both ends thereof, compressing the bushings endwise to form heads at the ends of the core, hardening the insulation in the bushings and the coatings on the laminæ, then removing the temporary holding means.

8. A laminated core wherein the laminæ are held together by hollow rivets of insulation, substantially as described.

9. In an electrical device, a laminated core having openings therethrough, and hollow rivets of fabric reinforced insulation extending through said openings and having integral heads at both ends bearing against the outer laminæ.

10. The method of lining an opening extending through a metal member with insulation, which consists of impregnating a strip of non-conductive fabric with fluid insulation, rolling up said strip to form a bushing, inserting said bushing in said opening, pressing said bushing against the sides of said opening and hardening said insulation.

11. The method of lining an opening extending through a metal member with insulation, which consists of impregnating a strip of non-conductive fabric with fluid insulation, rolling up said strip to form a bushing, inserting said bushing in said opening with the ends of the bushing extending beyond the ends of the opening, flattening out the extending ends against the ends of the opening to form heads, then hardening the insulation.

In testimony whereof I affix my signature.
VINCENT G. APPLE.